United States Patent
Chung et al.

(10) Patent No.: US 8,795,829 B2
(45) Date of Patent: Aug. 5, 2014

(54) UV-REFLECTING COMPOSITIONS

(75) Inventors: Chao Jen Chung, North Wales, PA (US); Edward E. Lafleur, Holland, PA (US); Edwin Nungesser, Horsham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 72 days.

(21) Appl. No.: 13/237,439

(22) Filed: Sep. 20, 2011

(65) Prior Publication Data

US 2012/0070655 A1    Mar. 22, 2012

Related U.S. Application Data

(60) Provisional application No. 61/384,788, filed on Sep. 21, 2010.

(51) Int. Cl.
| | | |
|---|---|---|
| *C08L 33/04* | (2006.01) | |
| *C08L 19/00* | (2006.01) | |
| *B32B 27/30* | (2006.01) | |
| *B32B 5/16* | (2006.01) | |
| *C08L 51/00* | (2006.01) | |
| *C09D 7/12* | (2006.01) | |
| *C08J 7/04* | (2006.01) | |
| *C09D 151/00* | (2006.01) | |
| *B82Y 30/00* | (2011.01) | |
| *C08J 5/18* | (2006.01) | |
| *C09D 5/33* | (2006.01) | |
| *C08F 220/06* | (2006.01) | |
| *C08F 220/14* | (2006.01) | |

(52) U.S. Cl.
CPC .............. *C08J 5/18* (2013.01); *C08J 2425/08* (2013.01); *C08J 2367/02* (2013.01); *C08L 51/003* (2013.01); *C09D 7/1266* (2013.01); *C08J 2425/14* (2013.01); *C08J 7/047* (2013.01); *C08F 220/06* (2013.01); *C09D 151/003* (2013.01); *B82Y 30/00* (2013.01); *C09D 7/1275* (2013.01); *C08F 220/14* (2013.01); *C09D 5/004* (2013.01)
USPC ........... 428/339; 252/588; 252/589; 525/191; 428/220; 428/323; 428/332; 428/338

(58) Field of Classification Search
USPC ........... 252/589, 588; 525/191; 428/330, 332, 428/323, 338, 220, 339
See application file for complete search history.

(56) References Cited

U.S. PATENT DOCUMENTS

| | | | |
|---|---|---|---|
| 4,501,470 | A | 2/1985 | Yeh |
| 7,214,421 | B2 * | 5/2007 | Leyrer et al. .................. 428/323 |
| 7,655,298 | B2 | 2/2010 | Thies et al. |
| 7,768,602 | B2 | 8/2010 | LaFleur et al. |
| 2005/0142343 | A1 | 6/2005 | Winkler et al. |
| 2006/0182968 | A1 | 8/2006 | Yoshida et al. |
| 2007/0218291 | A1 | 9/2007 | Chiou et al. |
| 2009/0098368 | A1 | 4/2009 | Wohlleben et al. |
| 2010/0015433 | A1 | 1/2010 | Arfsten et al. |

FOREIGN PATENT DOCUMENTS

| | | |
|---|---|---|
| EP | 2343579 | 7/2011 |
| JP | 2009280693 | 3/2009 |

* cited by examiner

*Primary Examiner* — Satya Sastri
(74) *Attorney, Agent, or Firm* — Kenneth Crimaldi

(57) ABSTRACT

A composition containing polymeric particles. The polymeric particles have an average particle diameter from 30 to 300 nm and a Vicker's scale hardness from 100 to 700 Kgf/mm². The composition also contains a film-forming polymer having $T_g$ no greater than 80° C. The refractive index difference between the polymeric particles and the film-forming polymer is at least 0.04.

13 Claims, No Drawings

UV-REFLECTING COMPOSITIONS

This invention relates to polymeric particles which self-associate to form a uv-reflective film which is particularly useful for protecting the substrate from the damaging effects of uv light.

Colloidal crystals have been disclosed for reflection of uv light. For example, U.S. Pub. No. 2006/0182968 discloses a liquid dispersion of particles for this purpose. However, this method requires use of dyes and removal of ionic components from the dispersion by dialysis.

The problem addressed by the present invention is to provide polymeric particles which form a uv-reflective film.

STATEMENT OF INVENTION

The present invention provides a composition comprising polymeric particles having: (a) an average particle diameter from 30 to 300 nm; and (b) a Vicker's scale hardness from 100 to 700 Kgf/mm$^2$; and a film-forming polymer having $T_g$ no greater than 80° C.; wherein a refractive index difference between the polymeric particles and the film-forming polymer is at least 0.04.

The present invention is further directed to a film comprising polymeric particles having: (a) an average particle diameter from 30 to 300 nm; (b) a Vicker's scale hardness from 100 to 700 Kgf/mm$^2$; and a continuous polymeric phase having $T_g$ no greater than 80° C.; wherein a refractive index difference between the polymeric particles and the continuous polymeric phase is at least 0.04; and wherein an average distance between the polymeric particles is from 35 to 400 nm.

DETAILED DESCRIPTION

Percentages are weight percentages (wt %) and temperatures are in ° C., unless specified otherwise. Refractive index (RI) values are determined at the sodium D line, where $\lambda$=589.29 nm at 20° C. Polymeric particles comprise organic polymers, preferably addition polymers, and preferably are substantially spherical. Average particle diameter is determined as the arithmetic mean particle diameter. $T_g$ values are calculated from homopolymer $T_g$ values using the Fox equation; see *Bulletin of the American Physical Society* 1, 3, page 123 (1956). Weight percentages of monomers are calculated for each stage of a multistage polymer based on the total weight of monomers added to the polymerization mixture in that stage. As used herein the term "(meth)acrylic" refers to acrylic or methacrylic, and "(meth)acrylate" refers to acrylate or methacrylate. The term "(meth)acrylamide" refers to acrylamide (AM) or methacrylamide (MAM). "Acrylic monomers" include acrylic acid (AA), methacrylic acid (MAA), esters of AA and MAA, itaconic acid (IA), crotonic acid (CA), acrylamide (AM), methacrylamide (MAM), and derivatives of AM and MAM, e.g., alkyl (meth)acrylamides. Esters of AA and MAA include, but are not limited to, alkyl, hydroxyalkyl, phosphoalkyl and sulfoalkyl esters, e.g., methyl methacrylate (MMA), ethyl methacrylate (EMA), butyl methacrylate (BMA), hydroxyethyl methacrylate (HEMA), hydroxyethyl acrylate (HEA), hydroxypropyl methacrylate (HPMA), hydroxybutyl acrylate (HBA), methyl acrylate (MA), ethyl acrylate (EA), butyl acrylate (BA), 2-ethylhexyl acrylate (EHA) and phosphoalkyl methacrylates (e.g., PEM). "Styrenic monomers" include styrene, α-methylstyrene; 2-, 3-, or 4-alkylstyrenes, including methyl- and ethyl-styrenes; divinylbenzene and divinyltoluene.

The term "vinyl monomers" refers to monomers that contain a carbon-carbon double bond that is connected to a heteroatom such as nitrogen or oxygen. Examples of vinyl monomers include, but are not limited to, vinyl acetate, vinyl formamide, vinyl acetamide, vinyl pyrrolidone, vinyl caprolactam, and long chain vinyl alkanoates such as vinyl neodecanoate, and vinyl stearate.

Preferably, the polymeric particles have a Vicker's scale hardness from 150 to 600 Kg f/mm$^2$, preferably from 200 to 500 Kgf/mm$^2$, preferably from 240 to 400 Kgf/mm$^2$. Vicker's hardness is measured using a standard hardness tester with a diamond tip. Hardness is determined from $H_v$=1.85444 (P/d$^2$), where P is the load in kg and d$^2$ is the area of indentation in mm$^2$. For particles in the size range of this invention, hardness is measured from larger particles having the same composition. Hardness for the particles of this invention was determined using the Shimadzu Micro Compression Testing Machine MCT 500.

Preferably, the polymeric particles are either: (a) particles having $T_g$ from 75 to 150° C.; (b) particles having at least 0.5% polymerized residues of crosslinkers; or a combination thereof. When the particles have a $T_g$ from -50° C. to 75° C., preferably the particles have at least 0.5% residues of crosslinkers, preferably at least 0.75%, preferably at least 1%, preferably at least 1.25%, preferably at least 1.5%, preferably at least 2%, preferably at least 3%, preferably at least 5%. Particles having $T_g$ from 75 to 150° C. may contain the amounts of crosslinker residues described above or may have much lower levels of crosslinker residues. The polymeric particles also may be highly crosslinked and have a high $T_g$, for example, particles formed by polymerization of divinylaromatic monomers (e.g., divinylbenzene), or monomer mixtures having large amounts of divinylaromatic monomers, preferably at least 30%, preferably at least 50%, preferably at least 70%, preferably at least 80%, in combination with other monomers, preferably styrenic or acrylic monomers.

Preferably, the polymeric particles have an average particle diameter of at least 50 nm, preferably at least 70 nm, preferably at least 80 nm. Preferably, the polymeric particles have an average particle diameter no greater than 260 nm, preferably no greater than 230 nm, preferably no greater than 200 nm, preferably no greater than 170 nm, preferably no greater than 140 nm. Preferably, the polymeric particles have a particle size distribution indicating a single mode; preferably the width of the particle size distribution at half-height is from 5 to 70 nm, preferably from 10 to 30 nm. The composition or the film may contain particles having different average diameters provided that particles of each average diameter have a particle size distribution as described immediately above. The particle size distribution is determined using a particle size analyzer. Preferably, the polymeric particles and the film-forming polymer are combined in the form of multistage polymeric particles which have an average particle diameter of at least 50 nm, preferably at least 70 nm, preferably at least 90 nm, preferably at least 110 nm, preferably at least 140 nm. Preferably, the multistage polymeric particles have an average particle diameter no greater than 450 nm, preferably no greater than 400 nm, preferably no greater than 350 nm, preferably no greater than 300 nm, preferably no greater than 260 nm, preferably no greater than 240 nm, preferably no greater than 220 nm, preferably no greater than 200 nm. Preferably, the multistage polymeric particles are two-stage particles, i.e., at least 70% of the particle has the properties indicated herein for the polymeric particle and film-forming polymer, preferably at least 80%, preferably at least 90%, preferably at least 95%. The multistage polymeric particles may be core-shell particles having the polymeric particle described above as the core and the film-forming polymer as the shell, or the film-forming polymer may be distributed on the surface of the polymeric particle discontinuously.

Preferably, the polymeric particle has $T_g$ from 75 to 150° C. Preferably, the polymeric particle has $T_g$ of at least 80° C., preferably at least 85° C., preferably at least 90° C., preferably at least 95° C. Preferably, the polymeric particle has $T_g$ no greater than 140° C., preferably no greater than 130° C., preferably no greater than 120° C. Preferably, the film-forming polymer or continuous polymeric phase has $T_g$ no greater than 60° C., preferably no greater than 50° C., preferably no greater than 40° C., preferably no greater than 30° C., preferably no greater than 20° C., preferably no greater than 10° C., preferably no greater than 0° C., preferably no greater than −10° C. Preferably, the film-forming polymer or continuous polymeric phase has $T_g$ of at least −50° C., preferably at least −40° C., preferably at least −30° C.

Refractive index differences stated herein are absolute values. Preferably, the refractive index difference (i.e., the absolute value of the difference) between the polymeric particle and the film-forming polymer, or between the polymeric particle and the continuous polymeric phase is at least 0.06, preferably at least 0.08, preferably at least 0.09, preferably at least 0.1, preferably at least 0.105. Preferably, the refractive index difference between the polymeric particle and the film-forming polymer, or between the polymeric particle and the continuous polymeric phase is no greater than 0.2, preferably no greater than 0.17, preferably no greater than 0.15. Preferably, the refractive index of the polymeric particle is from 1.45 to 1.75, preferably from 1.5 to 1.67, preferably from 1.53 to 1.65. Preferably, the refractive index of the film-forming polymer or the continuous polymeric phase is from 1.4 to 1.6, preferably from 1.4 to 1.55, preferably from 1.42 to 1.52. Preferably, the refractive index of the polymeric particle is greater than the refractive index of the film-forming polymer or the continuous polymeric phase.

In the composition of this invention, the weight ratio of film-forming polymer to polymeric particles preferably is from 0.8:1 to 15:1, preferably from 1:1 to 10:1, preferably from 1.2:1 to 8:1. In the continuous phase in the film, the average distance between the polymeric particles, i.e., the center-center distance between the particles, is from 40 to 300 nm, preferably from 50 to 200 nm, preferably from 70 to 130 nm.

Preferably, the film-forming polymer or the continuous polymeric phase comprises at least 60% polymerized residues of acrylic monomers, preferably at least 70%, preferably at least 80%, preferably at least 90%, preferably at least 95%. Preferably, the film-forming polymer or the continuous polymeric phase comprises from 35 to 70% polymerized residues of $C_4$-$C_{12}$ alkyl (meth)acrylate(s), preferably from 40 to 65%, preferably from 45 to 65%. Preferably, the $C_4$-$C_{12}$ alkyl (meth)acrylate(s) are $C_4$-$C_{12}$ alkyl acrylate(s), preferably $C_4$-$C_{10}$ alkyl acrylate(s), preferably BA and/or EHA. Preferably, the film-forming polymer or the continuous polymeric phase also comprises 30 to 65% polymerized residues of $C_1$-$C_4$ alkyl (meth)acrylate(s), preferably from 35 to 60%, preferably from 35 to 55%, and 0 to 5% polymerized residues of acid monomers (e.g., AA, MAA, IA, CA) and may also contain small amounts of residues of vinyl monomers. Preferably, the $C_1$-$C_4$ alkyl (meth)acrylate(s) are $C_1$-$C_2$ alkyl (meth)acrylate(s), preferably MMA and/or EMA. Preferably, the polymeric particle comprises at least 60% polymerized residues of styrenic monomers, preferably at least 70%, preferably at least 80%, preferably at least 90%, preferably at least 95%. Preferably, the polymeric particle also comprises 0 to 5% polymerized residues of acid monomers (e.g., AA, MAA, IA, CA), preferably 0.5 to 4% AA and/or MAA, and may also contain small amounts of residues of vinyl monomers.

Crosslinkers are monomers having two or more ethylenically unsaturated groups, or coupling agents (e.g., silanes) or ionic crosslinkers (e.g., metal oxides). Crosslinkers having two or more ethylenically unsaturated groups may include, e.g., divinylaromatic compounds, di-, tri- and tetra-(meth)acrylate esters, di-, tri- and tetra-allyl ether or ester compounds and allyl (meth)acrylate. Preferred examples of such monomers include divinylbenzene (DVB), trimethylolpropane diallyl ether, tetraallyl pentaerythritol, triallyl pentaerythritol, diallyl pentaerythritol, diallyl phthalate, diallyl maleate, triallyl cyanurate, Bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA) and butylene glycol dimethacrylate (BGDMA). Preferably, the amount of polymerized crosslinker residue in the film-forming polymer or the continuous polymeric phase is no more than 0.2%, preferably no more than 0.1%, preferably no more than 0.05%, preferably no more than 0.02%, preferably no more than 0.01%. Preferably, the amount of polymerized crosslinker residue in the polymeric particle having $T_g$ from 75 to 150° C. is no more than 0.5%, preferably no more than 0.3%, preferably no more than 0.2%, preferably no more than 0.1%, preferably no more than 0.05%. Preferably, if crosslinkers are present, they have a molecular weight from 100 to 250, preferably from 110 to 230, preferably from 110 to 200, preferably from 115 to 160. Preferably, crosslinkers are difunctional or trifunctional, i.e., they are diethylenically or triethylenically unsaturated, respectively, preferably difunctional.

Preferably, the composition of this invention is an aqueous emulsion of the polymeric particles of this invention, preferably at a solids level from 35 to 65%, preferably from 40 to 60%. When the polymeric particles and the film-forming polymer are combined in a multistage particle, preferably the composition is produced from the appropriate monomers by multi-stage emulsion polymerization. Preferably there are two polymerization stages in which different monomer compositions are introduced into the polymerization, although the particles may be made in more stages providing the overall composition is as indicated herein. Preferably, the composition and the film are substantially free of pigments or solid inorganic particles, i.e., they have less than 0.5 wt %, preferably less than 0.2 wt %, preferably less than 0.1 wt %, preferably less than 0.05 wt %.

Preferably, the film comprising polymeric particles of the present invention is produced by coating an aqueous emulsion of the multistage polymeric particles of this invention onto a solid substrate and allowing the coating to dry. Preferably, the substrate is glass, wood, masonry, drywall, leather, paper, textile, metal, plastic, a paint film or other polymeric coating on any of the aforementioned substrates, or an optically clear plastic, e.g., poly(ethyleneterephthalate); preferably glass or an optically clear plastic. Preferably, the wet coating has a thickness from 0.25 to 30 mils (0.0064 to 0.76 mm), preferably from 2 to 30 mils (0.05 to 0.76 mm), preferably from 4 to 20 mils (0.1 to 50 mm), preferably from 6 to 12 mils (0.15 to 0.3 mm). It is believed that the polymeric particles associate to produce a matrix of cores in a substantially face-centered cubic or hexagonal close packed arrangement with the outer layer forming the continuous polymeric phase.

EXAMPLES

Example 1

An example of the multistage polymer particles composed of: styrene, butyl acrylate and methacrylic acid: (1(97Styrene/3MAA)/1.5(58BA/41MMA/1MAA)) was prepared by the following process steps:

A 5-liter round-bottomed flask was equipped with paddle stirrer, thermometer, nitrogen inlet and reflux condenser. To 733.8 g DI water heated to 89° C. in the flask under a nitrogen atmosphere with stiffing was added 3.01 g SIPONATE DS-4 (22.5% solids) followed by 50.83 g monomer emulsion which was prepared from 377.31 g DI water, 10.88 g SIPONATE DS-4 (22.5% solids), 581.82 g styrene and 17.99 g MAA. 0.65 g ammonium persulfate dissolved in 13.89 g water was added to the flask. After temperature peaked, the remaining monomer emulsion was added to the kettle over 120 minutes at 85° C. with the rate at the first 5 minutes is half of the rest of 115 minutes. During the feed time, 0.28 g ammonium persulfate dissolved in 55.56 g water were also added to the kettle. Five minutes after the monomer addition, 0.23 g ammonium persulfate dissolved in 60.19 g water were added to the kettle over 15 minutes, followed by 416.67 g DI water. After the kettle is cooled to 20° C., 1.8 g 1.0% $FeSO_4.7H_2O$ and 1.8 g 1.0% VERSENE in 20 g of DI water was added and the solution made of 3.5 g t-butyl hydroperoxide (70%) dissolved in 45.0 g DIwater and 2.40 g isoascorbic acid dissolved in 45.0 g DI water were added to the kettle over a 90 minutes period. Two minutes after the initial addition, second monomer emulsion which was prepared from 226 g DI water, 14.60 g SIPONATE DS-4 (22.5% solids), 522 g BA, 369 g MMA and 9 g MAA. was also added at 7 g/minute. After 30 minutes, the rate increased to 14 g/minute and further increased to 17 g/minutes after another 30 minutes. After the addition, 1.6 g t-butyl hydroperoxide (70%) dissolved in 15.0 g DIwater and 0.90 g isoascorbic acid dissolved in 15.0 g DI water were added to the kettle over a 15 minutes period. The emulsion polymer was then neutralized with 20 g of 14% ammonia at a temperature below 45° C.

Examples: 2-4

These examples elucidate the preparation of thin film coatings on 0.16 mm poly(ethylene terephthalate) substrate (MYLAR). The particle size of each latex was measured by a Brookhaven Instruments particle size analyzer BI-90, the values are listed in TABLE I below. The examples illustrate the optical properties of the self-associating particles. The compositions are listed in the TABLE I. The films were drawn using a bird applicator (3 mils wet) or DOW bar (20 mils wet). Most of the coated samples were dried in oven at a temperature of 120° C. for 3 minutes prior to evaluation by a model U-2000 double-beam UV/Vis spectrophotometer.

Examples: 5-8

The examples which are listed in TABLE I were similarly prepared as 0.16 mm coatings onto poly(ethylene terephthalate) substrates (MYLAR). The particle size of each latex was measured by a Brookhaven Instruments particle size analyzer BI-90, the values are listed in TABLE I below. The examples illustrate the optical features of the self-associating particles. All of the films were drawn using a bird applicator (3 mils wet) or DOW bar (20 mils wet). Most of the coated samples were dried in oven at a temperature of 120° C. for 3 minutes. The UV/Vis transmission (% T) was measured by a model U-2000 double-beam UV/Vis spectrophotometer.

Examples: 9-13

The following examples, listed in TABLE I, described polymeric films that were similarly prepared as 0.16 mm coatings onto poly(ethylene terephthalate) substrates (MYLAR). The particle size of each latex was measured by a Brookhaven Instruments particle size analyzer BI-90, the values are listed in TABLE I below. The examples illustrate the optical features of the self-associating particles. All of the films were drawn using a bird applicator (3 mils wet) or DOW bar (20 mils wet). Most of the coated samples were dried in an oven at a temperature of 120° C. for 3 minutes. The UV/Vis transmission was measured by a model U-2000 double-beam UV/Vis spectrophotometer.

Examples: 14-16

The film compositions and optical properties, listed in TABLE I, were prepared from dispersion onto 0.16 mm PET, poly(ethylene terephthalate) substrates (MYLAR). The particle size of each latex was measured by a Brookhaven Instruments particle size analyzer BI-90, the values are listed in TABLE I below. The examples illustrate the optical features of the self-associating particles. All of the films were drawn using a bird applicator (3 mils wet) or DOW bar (20 mils wet). Most of the coated samples were dried in an oven at a temperature of 120° C. for 3 minutes. The UV/Vis transmission was measured by a model U-2000 double-beam UV/Vis spectrophotometer.

Example: 17

The film composition and optical properties, listed in TABLE I, was prepared from dispersion onto 0.16 mm PET, poly(ethylene terephthalate) substrates (MYLAR). The particle size of the latex was measured by a Brookhaven Instruments particle size analyzer BI-90, the value is listed in TABLE I below. The example illustrate the optical features of the self-associating particles. The film was drawn using a bird applicator (3 mils wet) or DOW bar (20 mils wet). The coated sample was dried in an oven at a temperature of 120° C. for 3 minutes. The UV/Vis transmission was measured by a model U-2000 double-beam UV/Vis spectrophotometer.

Examples: 18-19

The film compositions and optical properties, listed in TABLE I, were prepared from colloidal latex dispersions onto 0.16 mm PET, poly(ethylene terephthalate) substrates (MYLAR). The particle size of each latex was measured by a Brookhaven Instruments particle size analyzer BI-90, the values are listed in TABLE I below. The examples illustrate the optical features of the self-associating particles. All of the films were drawn using a bird applicator (3 mils wet) or DOW bar (20 mils wet). Most of the coated samples were dried in an oven at a temperature of 120° C. for 3 minutes. The UV/Vis transmission was measured by a model U-2000 double-beam UV/Vis spectrophotometer.

Examples: 20-22

The film compositions and optical properties, listed in TABLE I, were prepared from colloidal latex dispersions onto 0.16 mm PET, poly(ethylene terephthalate) substrates (MY- LAR). The particle size of each latex was measured by a Brookhaven Instruments particle size analyzer BI-90, the values are listed in TABLE I below. The examples illustrate the optical features of the self-associating particles. All of the films were drawn using a bird applicator (3 mils wet) or DOW bar (20 mils wet). Most of the coated samples were dried in an oven at a temperature of 120° C. for 3 minutes. The UV/Vis transmission was measured by a model U-2000 double-beam UV/Vis spectrophotometer.

Examples: 23-25

The polymer compositions, listed in TABLE I, were in the form of colloidal latex dispersions. The dispersions were coated onto 0.16 mm PET, poly(ethylene terephthalate) films (MYLAR). The particle size of each latex was measured by a Brookhaven Instruments particle size analyzer BI-90, the values are listed in TABLE I below. The examples illustrate the optical features of the self-associating particles. All of the films were drawn using a bird applicator (3 mils wet) or DOW bar (20 mils wet). Most of the coated samples were dried in an oven at a temperature of 120° C. for 3 minutes. The UV/Vis transmission was measured by a model U-2000 double-beam UV/Vis spectrophotometer.

Examples: 26-28

The polymer compositions, listed in TABLE I, were in the form of colloidal latex dispersions. The dispersions were coated onto 0.16 mm PET, poly(ethylene terephthalate) films (MYLAR). The particle size of each latex was measured by a Brookhaven Instruments particle size analyzer BI-90, the values are listed in TABLE I below. These examples illustrate the optical features of the self-associating particles. All of the films were drawn using a bird applicator (3 mils wet) or DOW bar (20 mils wet). Most of the coated samples were dried in an oven at a temperature of 120° C. for 3 minutes. The UV/Vis transmission was measured by a model U-2000 double-beam UV/Vis spectrophotometer.

Examples: 29-37

These examples illustrate the use of a thickener, ACRYSOL ASE-60 thickener, in enhancing the viscosity of the colloidal latex. As shown in TABLE I, the latex compositions, with and without the ASE-60 thickener were coated onto 0.16 mm PET, poly(ethylene terephthalate) films (MYLAR). The particle size of each latex was measured by a Brookhaven Instruments particle size analyzer BI-90, the values are listed in TABLE I below. These examples illustrate the optical features of the self-associating particles. All of the films were drawn using a bird applicator (3 mils wet) or DOW bar (20 mils wet). Most of the coated samples were dried in an oven at a temperature of 120° C. for 3 minutes. The UV/Vis transmission was measured by a model U-2000 double-beam UV/Vis spectrophotometer.

Examples: 38-45

The polymer compositions, listed in TABLE I, were in the form of colloidal latex dispersions. The dispersions were coated onto 0.16 mm PET, poly(ethylene terephthalate) films (MYLAR). The particle size of each latex was measured by a Brookhaven Instruments particle size analyzer BI-90; the values are for the entire multistage particle. These examples illustrate the optical features of the self-associating particles. All of the films were drawn using a bird applicator (3 mils wet) or DOW bar (20 mils wet). Most of the coated samples were dried in an oven at a temperature of 120° C. for 3 minutes. The UV/Vis transmission was measured by a model U-2000 double-beam UV/Vis spectrophotometer. The refractive index for the cores would be expected to be very close to the refractive index for polystyrene and that of the acrylic outer layer close to that of acrylic ester polymers, i.e., 1.59 and 1.46-1.49, respectively.

TABLE 1

Optical properties of UV reflectance coatings and chemical composition

| Ex. | Composition | Particle size (nm) | Film thickness | % T (@ 350 nm) | % T (@ 600 nm) |
|---|---|---|---|---|---|
| 2 | 1 core182 nm(97STY/3MAA)//1.5(58BA/41MMA/1MMA) | 237 | 8 mils wet | 5.8 | 86.8 |
| 3 | 1 core182 nm(97STY/3MAA)//1.5(58BA/41MMA/1MMA) | 237 | 5 mils wet | 19.8 | 93.2 |
| 4 | 1 core182 nm(97STY/3MAA)//1.5(58BA/41MMA/1MMA) | 237 | 3 mils wet | 40.1 | 95.6 |
| 5 | 1 core 98 nm(99STY/1MAA)//1.5(58BA/41MMA/1MMA) | 120 | 8 mils wet | 58 | 97.4 |
| 6 | 1 core 98 nm(99STY/1MAA)//1.5(58BA/41MMA/1MMA) | 120 | 5 mils wet | 73.9 | 99.3 |
| 7 | 1 core 98 nm(99STY/1MAA)//1.5(58BA/41MMA/1MMA) | 120 | 3 mils wet | 85 | 99.8 |
| 8 | 1 core 98 nm(99STY/1MAA)//1.5(58BA/41MMA/1MMA) | 120 | 8 mils wet | 58.2 | 92.2 |
| 9 | 1 core 98 nm(99STY/1MAA)//2.5(58BA/41MMA/1MMA) | 125 | 8 mils wet | 59.5 | 99.1 |
| 10 | 1 core 98 nm(99STY/1MAA)//2.5(58BA/41MMA/1MMA) | 125 | 5 mils wet | 73.8 | 99.5 |
| 11 | 1 core 98 nm(99STY/1MAA)//2.5(58BA/41MMA/1MMA) | 125 | 3 mils wet | 86.2 | 100.4 |
| 12 | 1 core 98 nm(99STY/1MAA)//2.5(58BA/41MMA/1MMA) | 125 | 20 mils | 29.1 | 91.6 |
| 13 | 1 core 98 nm(99STY/1MAA)//2.5(58BA/41MMA/1MMA) | 125 | 20 mils | 33.3 | 95.3 |
| 14 | 1 core 98 nm(99STY/1MAA)//4(58BA/41MMA/1MMA) | 141 | 8 mils wet | 54.1 | 99.5 |
| 15 | 1 core 98 nm(99STY/1MAA)//4(58BA/41MMA/1MMA) | 141 | 5 mils wet | 73.5 | 99.9 |
| 16 | 1 core 98 nm(99STY/1MAA)//4(58BA/41MMA/1MMA) | 141 | 3 mils wet | 83.8 | 100.3 |
| 17 | 1 core 40 nm(97STY/3MAA)//2.5(58BA/41MMA/1MMA) | 59 | 8 mils wet | 26.4 | 52.1 |
| 18 | 1 core 130 nm(97STY/3MAA)//9(58BA/41MMA/1MMA) | 253 | 20 mils | 6.5 | 89.6 |
| 19 | 1 core 130 nm(97STY/3MAA)//9(58BA/41MMA/1MMA) | 253 | 20 mils | 6.1 | 91.1 |
| 20 | 1 core 130 nm(97STY/3MAA)//4(58BA/41MMA/1MMA) | 217 | 8 mils wet | 13.5 | 96.6 |
| 21 | 1 core 130 nm(97STY/3MAA)//4(58BA/41MMA/1MMA) | 217 | 5 mils wet | 53.9 | 99.5 |
| 22 | 1 core 130 nm(97STY/3MAA)//4(58BA/41MMA/1MMA) | 217 | 3 mils wet | 53.4 | 98.9 |
| 23 | 1 core 130 nm(97STY/3MAA)//2.5(58BA/41MMA/1MMA) | 190 | 8 mils wet | 14.3 | 94.4 |
| 24 | 1 core 130 nm(97STY/3MAA)//2.5(58BA/41MMA/1MMA) | 190 | 5 mils wet | 28.8 | 96.8 |
| 25 | 1 core 130 nm(97STY/3MAA)//2.5(58BA/41MMA/1MMA) | 190 | 3 mils wet | 51.9 | 98.5 |
| 26 | 1 core 130 nm(97STY/3MAA)//1.5(58BA/41MMA/1MMA) | 169 | 8 mils wet | 11.5 | 90.7 |
| 27 | 1 core 130 nm(97STY/3MAA)//1.5(58BA/41MMA/1MMA) | 169 | 5 mils wet | 31.7 | 94.4 |
| 28 | 1 core 130 nm(97STY/3MAA)//1.5(58BA/41MMA/1MMA) | 169 | 3 mils wet | 48.1 | 95.6 |
| 29 | 1core201 nm(97STY/3MAA)//1.5(58BA/41MMA/1MAA) | 259 | #5 wire | 15.8 | 72.7 |
| 30 | 1core201 nm(97STY/3MAA)//1.5(58BA/41MMA/1MAA) | 259 | 3 mils wet | 0.1 | 82.5 |
| 31 | 1core201 nm(97STY/3MAA)//1.5(58BA/41MMA/1MAA) | 259 | 3 mils wet | 5.7 | 72.6 |
| 32 | (Ex. 41 + 2 gms A (50%)) | 259 | #5 wire | 45.6 | 95.06 |
| 33 | (Ex. 41 + 2 gms A (50%)) | 259 | 3 mils wet | 5.4 | 79.0 |

TABLE 1-continued

Optical properties of UV reflectance coatings and chemical composition

| | | | | |
|---|---|---|---|---|
| 34 (Ex. 41 + 2 gmsA (25%) filtered) | 259 | 3 mils wet | 11.3 | 90.7 |
| 35 (Ex. 41 + 0.5 gms A (100%) filtered) | 259 | 3 mils wet | 8.6 | 88.2 |
| 36 (Ex. 41 + 10 gms A (7%)) | 259 | 3 mils wet | 9.4 | 85.7 |
| 37 (Ex. 41 + 20 gms A (7%)) | 259 | 3 mils wet | 9.7 | 87.4 |
| 38 1core289 nm(97STY/3MAA)//1.5 (58BA/41MMA/1MAA) | 401 | 3 mils wet | 36.9 | 84.9 |

Examples: 46-57

In this series of examples, dispersions of the self-associating particles were coated at 3 mils (0.076 mm) wet onto glass substrate for exposure to ultraviolet radiation at 55% relative humidity. The test plates are of the following dimension in surface area: 83 mm×76 mm. These plates were evaluated by: ASTM D 10003-00 (Standard test method for haze and luminous transmittance of transparent plastics) and ASTM E 313-00 (Standard practice for calculating yellowness and whiteness indices from instrumentally measured color coordinates).

TABLE II

Weatherometer study of samples drawn on glass using bird applicator

| Ex. | QUV samples $T_1$ = 1000 hrs | L | a | b | Haze | $Y_{total}$ | YI | 457 bright. | % T at 600 nm | % T at 350 nm |
|---|---|---|---|---|---|---|---|---|---|---|
| 46 | control | 95.64 | −0.87 | 2.43 | 2.50 | 91.47 | 3.89 | 88.34 | 95.3 | 64.1 |
| 47 | @ $T_1$ | 94.26 | 1.57 | 4.59 | 7.82 | 88.85 | 7.50 | 83.10 | 87.2 | 37.7 |
| 48 | control | 94.81 | −1.02 | 3.04 | 3.26 | 89.89 | 4.95 | 86.05 | 93.5 | 32.0 |
| 49 | @ $T_1$ | 95.41 | −2.11 | 5.80 | 12.69 | 91.02 | 9.27 | 83.73 | 68.5 | 4.30 |
| 50 | control | 94.98 | −1.33 | 4.48 | 9.70 | 90.21 | 7.43 | 84.51 | 84.7 | 20.4 |
| 51 | @ $T_1$ | 95.23 | −1.42 | 3.98 | 8.57 | 90.69 | 6.39 | 85.65 | 88.0 | 35.6 |
| 52 | control | 94.84 | −1.35 | 5.11 | 4.46 | 89.94 | 8.61 | 83.22 | 93.8 | 27.0 |
| 53 | @ $T_1$ | 95.53 | −1.77 | 4.76 | 11.56 | 91.27 | 7.57 | 85.25 | 86.5 | 37.3 |
| 54 | control | 95.91 | −0.67 | 1.45 | 2.53 | 91.99 | 2.21 | 90.13 | 93.7 | 76.1 |
| 55 | @ $T_1$ | 94.61 | −1.18 | 3.15 | 8.15 | 89.51 | 5.05 | 85.55 | 85.0 | 41.8 |
| 56 | control | 94.31 | −1.68 | 6.17 | 6.25 | 88.95 | 10.40 | 80.93 | 89.9 | 14.8 |
| 57 | @ $T_1$ | 94.57 | 2.64 | 8.68 | 10.41 | 89.44 | 14.40 | 78.35 | 84.4 | 18.4 |

TABLE 1-continued

Optical properties of UV reflectance coatings and chemical composition

| | | | | |
|---|---|---|---|---|
| 39 1core289 nm(97STY/3MAA)//1.5 (58BA/41MMA/1MAA) | 401 | 5 mils wet | 16.4 | 66.7 |
| 40 1core289 nm(97STY/3MAA)//1.5 (58BA/41MMA/1MAA) | 401 | 8 mils wet | 0.5 | 42.6 |
| 41 1core201 nm(97STY/3MAA)//1.5 (58BA/41MMA/1MAA) | 259 | 3 mils wet | 1.5 | 85.1 |
| 42 1core201 nm(97STY/3MAA)//1.5 (58BA/41MMA/1MAA) | 259 | 3 mils wet | 1.2 | 84.1 |
| 43 (120 mesh filtration) | 259 | 3 mils wet | 3.0 | 74 |
| 44 (200 mesh filtration) | 259 | 3 mils wet | 3.2 | 83.5 |
| 45 1core201 nm(97STY/3MAA)//1.5 (58BA/41MMA/1MAA) | 259 | 5 mils wet | 3.8 | 85.5 |

| Composition | Film thickness | % T (@ 500 nm) | % T (@600 nm) | % Refl. (@ 350 nm) | % Refl. (@600 nm) |
|---|---|---|---|---|---|
| 1core40 nm(97STY/3MAA)//2.5(58BA/41MMA/1MAA) | 8 mils wet | 89% | 90% | 24% | 20% |
| 1core98 nm(99STY/1MAA)//2.5(58BA/41MMA/1MAA) | 8 mils wet | 87% | 89% | 14% | 2% |
| 1core130 nm(97STY/3MAA)//4(58BA/41MMA/1MAA) | 8 mils wet | 82% | 88% | 23% | 4% |
| 1core130 nm(97STY/3MAA)//2.5(58BA/41MMA/1MAA) | 8 mils wet | 81% | 88% | 22% | 4% |
| 1core130 nm(97STY/3MAA)//1.5(58BA/41MMA/1MAA) | 8 mils wet | 82% | 88% | 23% | 5% |
| 1core98 nm(99STY/1MAA)//1.5(58BA/41MMA/1MAA) | 8 mils wet | 86% | 88.2% | 10% | 2.3% |

Examples: 58-67

The examples describe blends of the previously mentioned self-associating particles, TABLE I, and thickener A, ACRYSOL ASE-60 thickener. Each thickened latex composition is coated onto Mylar film. The test pieces are of the following dimension in surface area: 77 mm×56 mm. All of the film coatings were dried in an oven at a temperature of 120° C. for 3 minutes. Samples were evaluated by UV/Vis transmission on a model U-2000 double-beam UV/Vis spectrophotometer.

The composition labeled "Ex. 80" is 1 part (Styrene/MAA=99/1)//9 parts (BA/MMA/MAA=58/41/01)

TABLE III

Blends of self-associated particles and thickener A

| Ex: Composition | Film thickness | % T (@350 nm) | % T (@600 nm) |
|---|---|---|---|
| 58 Ex. 80 (5%) + Ex. 9 (75%) + Ex. 18 (20%) + 18.74 g A (7%) | 20 mils | 11.1 | 90.8 |
| 59 Ex. 80 (10%) + Ex. 9 (70%) + Ex. 18 (20%) + 20.44 g A (7%) | 20 mils | 11.8 | 89.8 |
| 60 Ex. 80 (20%) + Ex. 9 (60%) + Ex. 18 (20%) + 19.96 g A (7%) | 20 mils | 13.3 | 89.7 |
| 61 Ex. 80 (15%) + Ex. 9 (65%) + Ex. 18 (20%) + 20.66 g A (7%) | 20 mils | 12.2 | 89.3 |
| 62 Ex. 9 (80%) + Ex. 18 (20) + 25.36 g A (7%) | 20 mils | 10.0 | 87.9 |
| 63 Ex. 9 (60%) + Ex. 18 (40) + 23.02 g A (7%) | 20 mils | 7.1 | 88.5 |
| 64 Ex. 9 (70%) + Ex. 18 (30) + 21.34 g A (7%) | 20 mils | 8.5 | 84.7 |
| 65 Ex. 9 (50%) + Ex. 18 (50) + 25.36 g A (7%) | 20 mils | 8.4 | 92.9 |

TABLE III-continued

Blends of self-associated particles and thickener A

| Ex: Composition | Film thickness | % T (@350 nm) | % T (@600 nm) |
|---|---|---|---|
| 66 Ex. 9 (50%) + Ex. 18 (50) + 25.36 g A (7%) | 20 mils | 0.8 | 81.3 |
| 67 Ex. 9 (50%) + Ex. 18 50) + 25.36 g A (7%) | 20 mils | 9.2 | 90.1 |

Examples: 68-73

In these examples, the 182 nm self-associating particles (Ex. 2) is combined with the 98 nm self-associating particles (Ex. 5) and the thickener ASE-60 to form coating compositions. The compositions, listed in TABLE IV, are coated onto glass substrates. The samples, drawn onto glass substrates, using a 3-mil bird applicator are subjected to 1000 hours of UV exposure in a QUV weatherometer. The test plates are of the following dimension in surface area: 83 mm×76 mm. These plates were evaluated by: ASTM D 10003-00 (Standard test method for haze and luminous transmittance of transparent plastics) and ASTM E 313-00 (Standard practice for calculating yellowness and whiteness indices from instrumentally measured color coordinates).

Examples: 74-79

In these examples, the 182 nm self-associating particles (Ex. 2) is combined with the 40 nm self-associating particles (Ex. 17) and ASE-60 thickener to form coating compositions. The compositions, listed in TABLE IV, are coated onto glass substrates. The samples, drawn onto glass substrates, 83 mm×76 mm in surface area, using a 3-mil bird applicator are subjected to 1000 hours of UV exposure in QUV weatherometer. The L, a, b values, haze data, YI and percentage transmittance values are evaluated by ASTM D 10003-00 (Standard test method for haze and luminous transmittance of transparent plastics) and ASTM E 313-00 (Standard practice for calculating yellowness and whiteness indices from instrumentally measured color coordinates).

TABLE IV

Weatherometer study of films prepared from self-associating particles and blends

| Ex | QUV samples $T_1$ = 1000 hrs | comp. | L | a | b | haze | Ytot | YI | 457 bright. | % T at 600 nm | % T at 350 nm |
|---|---|---|---|---|---|---|---|---|---|---|---|
| 68 | Control | Ex. 9 | 92.52 | −0.98 | 7.42 | 4.42 | 85.61 | 13.56 | 76.10 | 89.8 | 49.0 |
| 69 | QUV $T_1$ | (70%) + Ex. 5 (30%) + A (1 gm) | 95.00 | −2.56 | 8.71 | 6.27 | 90.25 | 14.45 | 79.12 | 91.6 | 33.0 |
| 70 | Control | Ex. 9 | 94.43 | −0.71 | 3.88 | 4.61 | 89.18 | 6.80 | 84.13 | 89.8 | 49.0 |
| 71 | QUV$_1$ $T_1$ | (60%) + Ex. 5 + (40%) + A (1 gm) | 94.72 | −1.90 | 5.96 | 5.28 | 89.71 | 9.78 | 82.17 | 88.4 | 32.2 |
| 72 | Control | Ex. 9 | 92.95 | −0.91 | 6.33 | 3.32 | 86.39 | 11.46 | 78.29 | 93.2 | 33.8 |
| 73 | QUV$_1$ $T_1$ | (50%) + Ex. 5 (50%) + A (1 gm) | 93.06 | 2.97 | 11.22 | 6.02 | 86.60 | 19.26 | 72.51 | 91.0 | 20.9 |
| 74 | Control | Ex. 9 | 93.02 | −1.19 | 6.55 | 4.96 | 86.52 | 11.66 | 78.14 | 91.3 | 25.9 |
| 75 | QUV$_1$ $T_1$ | (70%) + 887 (30) + A (1 gm) | 93.99 | −2.69 | 9.67 | 4.54 | 88.34 | 16.32 | 76.10 | 93.5 | 17.3 |
| 76 | Control | Ex. 9 | 92.30 | −2.18 | 7.09 | 4.11 | 85.19 | 12.02 | 76.44 | 90.8 | 32.9 |
| 77 | QUV$_1$ $T_1$ | (60%) + 887 (40%) + A (1 gm) | 94.33 | −2.28 | 7.44 | 3.90 | 88.98 | 12.35 | 79.59 | 91.6 | 24.3 |
| 78 | Control | Ex. 9 | 94.08 | −1.21 | 5.16 | 2.56 | 88.52 | 8.87 | 81.91 | 94.0 | 34.4 |
| 79 | QUV$_1$ $T_1$ | (50%) + 887 (50) + A (1 gm) | 94.27 | 2.29 | 7.33 | 3.94 | 88.86 | 12.16 | 79.62 | 92.1 | 26.0 |

The invention claimed is:

1. A composition comprising polymeric particles having: (a) an average particle diameter of at least 30 nm but less than 50 nm; and (b) a Vicker's scale hardness from 100 to 700 Kgf/mm$^2$; and a film-forming polymer having $T_g$ no greater than 80° C.; wherein a refractive index difference between the polymeric particles and the film-forming polymer is at least 0.04; wherein the polymeric particles have $T_g$ from −50° C. to 75° C. and at least 2 wt % polymerized residues of crosslinkers; and wherein a weight ratio of the film-forming polymer to the polymeric particles is from 1.2:1 to 8:1.

2. The composition of claim 1 in which the refractive index difference between the polymeric particles and the film-forming polymer is at least 0.08.

3. The composition of claim 2 in which the polymeric particle comprises at least 70 wt % polymerized residues of styrenic monomers and the film-forming polymer comprises at least 70 wt % polymerized residues of acrylic monomers.

4. The composition of claim 3 in which the refractive index difference between the polymeric particles and the film-forming polymer is at least 0.105.

5. A film comprising polymeric particles having: (a) an average particle diameter of at least 30 nm but less than 50 nm; (b) a Vicker's scale hardness from 100 to 700 Kgf/mm²; and a continuous polymeric phase having $T_g$ no greater than 80° C.; wherein a refractive index difference between the polymeric particles and the continuous polymeric phase is at least 0.04; wherein an average distance between the polymeric particles is from 35 to 400 nm; wherein the polymeric particles have $T_g$ from −50° C. to 75° C. and at least 2 wt % polymerized residues of crosslinkers; and wherein a weight ratio of the continuous polymeric phase to the polymeric particles is from 1.2:1 to 8:1.

6. The film of claim 5 in which the refractive index difference between the polymeric particles and the continuous polymeric phase is at least 0.08.

7. The film of claim 6 in which the average distance between the polymeric particles is from 50 to 200 nm.

8. The film of claim 7 in which polymeric particles comprise at least 70 wt % polymerized residues of styrenic monomers and the continuous polymeric phase comprises at least 70 wt % polymerized residues of acrylic monomers.

9. The film of claim 8 in which refractive index difference between the polymeric particles and the continuous polymeric phase is at least 0.11.

10. The film of claim 5 in which a weight ratio of the continuous polymeric phase to the polymeric particles is from 1.4:1 to 4:1.

11. The composition of claim 1 in which a weight ratio of the film-forming polymer to the polymeric particles is from 1.4:1 to 4:1.

12. The film of claim 10 in which the polymeric particles have at least 3 wt % polymerized residues of crosslinkers.

13. The composition of claim 11 in which the polymeric particles have at least 3 wt % polymerized residues of crosslinkers.

* * * * *